US012779790B2

(12) United States Patent
Sato et al.

(10) Patent No.: US 12,779,790 B2
(45) Date of Patent: Nov. 3, 2026

(54) COMPONENT BONDING METHOD AND COMPONENT ASSEMBLY

(71) Applicant: CANON KABUSHIKI KAISHA, Tokyo (JP)

(72) Inventors: Ryo Sato, Kanagawa (JP); Yukuo Yamaguchi, Tokyo (JP); Shuichi Hasegawa, Kanagawa (JP); Tomoaki Kamagata, Kanagawa (JP); Daiki Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 18/933,043

(22) Filed: Oct. 31, 2024

(65) Prior Publication Data

US 2025/0144891 A1 May 8, 2025

(30) Foreign Application Priority Data

Nov. 7, 2023 (JP) ................................ 2023-190087

(51) Int. Cl.
*B29C 65/48* (2006.01)
*B29C 65/54* (2006.01)

(52) U.S. Cl.
CPC ........ *B29C 65/4815* (2013.01); *B29C 65/542* (2013.01)

(58) Field of Classification Search
CPC .......................... B29C 65/542; B29C 65/4815
See application file for complete search history.

(56) References Cited

U.S. PATENT DOCUMENTS 9,475,288 B2 * 10/2016 Kudo ......................... B41J 2/14
2019/0366715 A1 * 12/2019 Shimizu ............... B41J 2/17553

FOREIGN PATENT DOCUMENTS

JP 6257995 B2 1/2018

OTHER PUBLICATIONS

Machine translation of JP2015226988 (Year: 2015).*

* cited by examiner

*Primary Examiner* — Vishal I Patel
(74) *Attorney, Agent, or Firm* — VENABLE LLP

(57) ABSTRACT

Multiple components are bonded to each other by assembling a first component, a second component, and an elastic component so that a first space and a second space separate from the first space are formed adjacent to the first component and the second component and the elastic component is accommodated in the first space in a compressed state, and filling the second space with a first molten resin to bond the first component and the second component.

10 Claims, 14 Drawing Sheets

COMPONENT BONDING METHOD AND COMPONENT ASSEMBLY

BACKGROUND OF THE INVENTION

Field of the Invention

The present disclosure relates to a component bonding method that bonds multiple components.

Description of the Related Art

As a part used in a liquid storage container or the like, an assembly is provided in which an elastic component is compressed by multiple components to bond each component. For bonding components in such an assembly, for example, a welding machine or an injection molding machine is used.

As an example of a component bonding method, Japanese Patent No. 6257995 describes a method of manufacturing a cap using a mold. In this manufacturing method, a lower frame part having an inner wall for accommodating an elastic stopper, which is an elastic component, is formed using a first upper mold and a common lower mold. The elastic stopper is accommodated in the lower frame part, a ring-shaped projection of the second upper mold is pressed against a peripheral edge of the elastic stopper, and molten resin is poured into a space formed by closing the second upper mold and the common lower mold, so that an upper frame part is formed. Thereby, a cap is obtained in which the elastic stopper is accommodated in a compressed state between the lower frame part and the upper frame part.

However, in the manufacturing method described in Japanese Patent No. 6257995, the upper frame part is formed directly on the elastic stopper while compressing the elastic stopper with the second upper mold. Therefore, it is necessary to use a material for the elastic stopper that can withstand the temperature and pressure during molding. In addition, it is necessary to impose restrictions on molding conditions so as to avoid the excessive deformation of the elastic stopper followed by the leakage of the molten resin when the elastic stopper is compressed by the second upper mold. Such restrictions on the material and molding conditions are factors that increase manufacturing costs and may reduce the reliability of bonding.

An object of the present disclosure is to provide a component bonding method that can reduce costs and improve the reliability of bonding.

SUMMARY OF THE INVENTION

In order to achieve the above object, an aspect of the present disclosure provides

- a component bonding method that bonds multiple components to each other, the method including:
- assembling a first component, a second component, and an elastic component so that a first space and a second space separate from the first space are formed adjacent to the first component and the second component and the elastic component is accommodated in the first space in a compressed state; and
- filling the second space with a first molten resin to bond the first component and the second component.

Another aspect of the present disclosure provides a component bonding method that forms and bonds components using a first mold and a second mold, the method including:

- forming a first component in the first mold and forming a second component in the second mold, the forming including forming the first component and the second component so that a first space and a second space separate from the first space are formed adjacent to the first component and the second component when the second component is assembled to the first component;
- relatively moving the second mold with respect to the first mold to assemble the second component to the first component, the assembling including forming the first space and the second space, and accommodating an elastic component in the first space in a compressed state; and
- filling the second space with a molten resin to bond the first component and the second component.

Further features of the present invention will become apparent from the following description of exemplary embodiments with reference to the attached drawings.

DESCRIPTION OF THE EMBODIMENTS

Hereinafter, embodiments of the present disclosure will be described in detail with reference to the drawings. However, the following embodiments are merely examples, and the scope of the present disclosure is not intended to be limited to these embodiments.

First, a liquid supply component to which the component bonding method of the present disclosure is applied will be described. This liquid supply component is an example of an assembly of components in which multiple components are bonded to each other, and is used as a stopper component (or valve component) of a liquid storage container of an inkjet printing apparatus.

Figure 1:
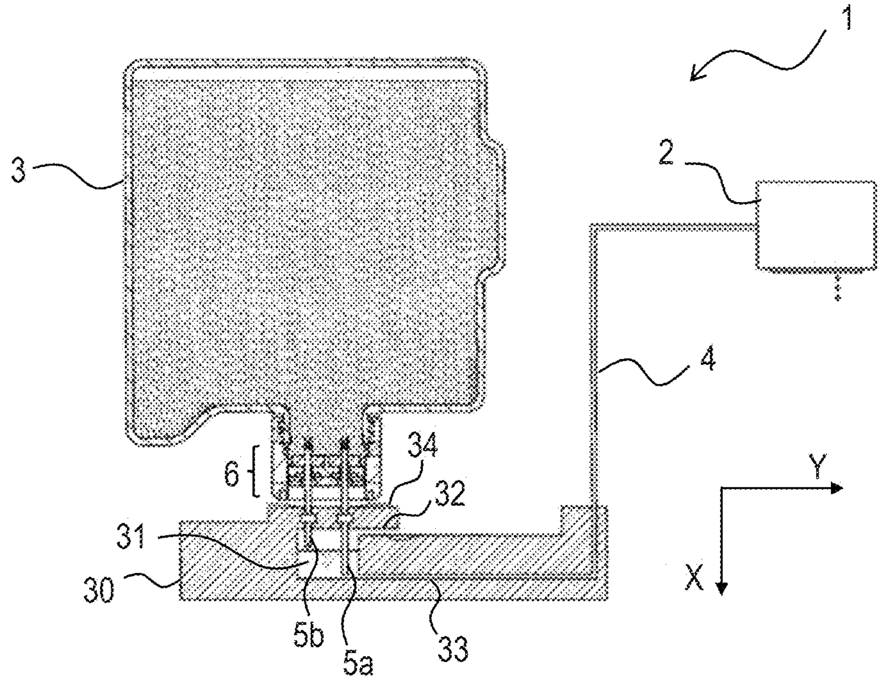
FIG. 1 is a schematic diagram showing a configuration of an inkjet printing apparatus.

FIG. 1 is a schematic diagram showing a configuration of an inkjet printing apparatus. Referring to FIG. 1, the inkjet printing apparatus 1 includes a liquid ejection head 2, a liquid storage container 3, a tube 4, hollow needles 5*a* and 5*b*, a liquid supply component 6, and a container mounting section 30. The liquid storage container 3 stores a liquid such as ink. The liquid storage container 3 is detachably attached to the container mounting section 30. The liquid supply component 6 is provided at a connection section (opening) of the liquid storage container 3 with the container mounting section 30. The liquid ejection head 2 is connected to the container mounting section 30 via the tube 4.

The container mounting section 30 includes a liquid storage section 31, an atmosphere communication port 32, a flow path 33, and a mounting section 34. The mounting section 34 is a part of a side wall of the liquid storage section 31, and two hollow needles 5*a* and 5*b* are provided so as to penetrate the side wall. The liquid storage container 3 is mounted on the mounting section 34 so that the hollow needles 5*a* and 5*b* are inserted into the liquid supply component 6. In a state where the liquid storage container 3 is mounted on the mounting section 34, the liquid storage section 31 communicates with the inside of the liquid storage container 3 via the hollow needles 5*a* and 5*b*. The atmosphere communication port 32 allows the inside of the liquid storage section 31 to communicate with the atmosphere.

The hollow needle 5*a* is longer than the hollow needle 5*b*. A tip of the hollow needle 5*a* is inserted into the liquid storage container 3, and a rear end thereof extends to the vicinity of a bottom surface of the liquid storage section 31. Liquid inside the liquid storage container 3 flows into the liquid storage section 31 via the hollow needle 5*a*. A tip of the hollow needle 5*b* is inserted into the liquid storage container 3, and a rear end thereof is disposed at a position higher than a liquid level of liquid stored in the liquid storage section 31. A space in a section higher than the liquid level inside the liquid storage section 31 communicates with the atmosphere communication port 32. By opening the hollow needle 5*b* to the atmosphere, it is possible to efficiently allow liquid to flow into the liquid storage section 31 from the liquid storage container 3.

One end of the flow path 33 opens to an inner wall of the liquid storage section 31, and one end of the tube 4 is connected to the other end of the flow path 33. Liquid stored in the liquid storage section 31 is supplied to the liquid ejection head 2 via the flow path 33 and the tube 4. The liquid ejection head 2 ejects the liquid supplied from the tube 4.

Figure 2A:
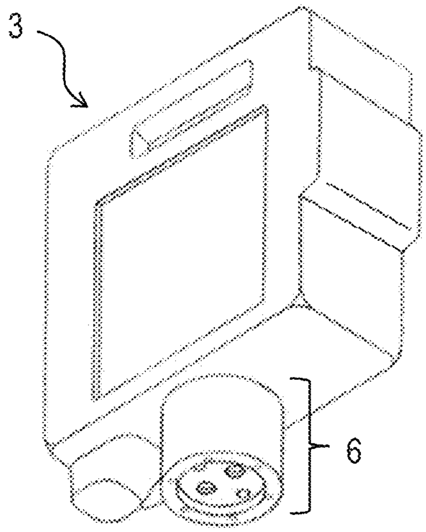
FIG. 2A is a schematic diagram showing a configuration of a liquid storage container.
Figure 2B:
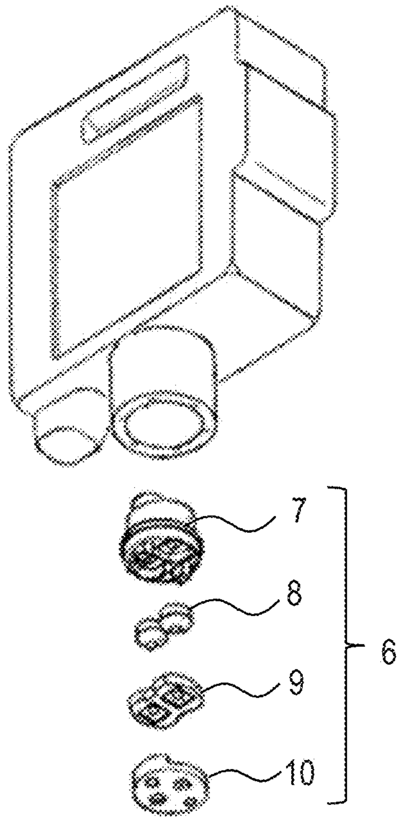
FIG. 2B is a schematic diagram showing each component of the liquid supply component disassembled.

FIGS. 2A and 2B are schematic diagrams showing a configuration of the liquid storage container 3. FIG. 2A shows a state where the liquid supply component 6 is attached, and FIG. 2B shows a state where each component of the liquid supply component 6 is disassembled.

As shown in FIGS. 2A and 2B, the liquid supply component 6 includes a first component 7, an elastic component 8, a second component 9, and a third component 10. The elastic component 8 is held in a compressed state between the first component 7 and the second component 9. The first component 7, the second component 9, and the third component 10 can be formed by, for example, injection molding. The method of forming these components is not limited to injection molding. For example, each component may be formed using a 3D printer.

Next, the configuration of the liquid supply component 6 will be specifically described.

Figure 3:
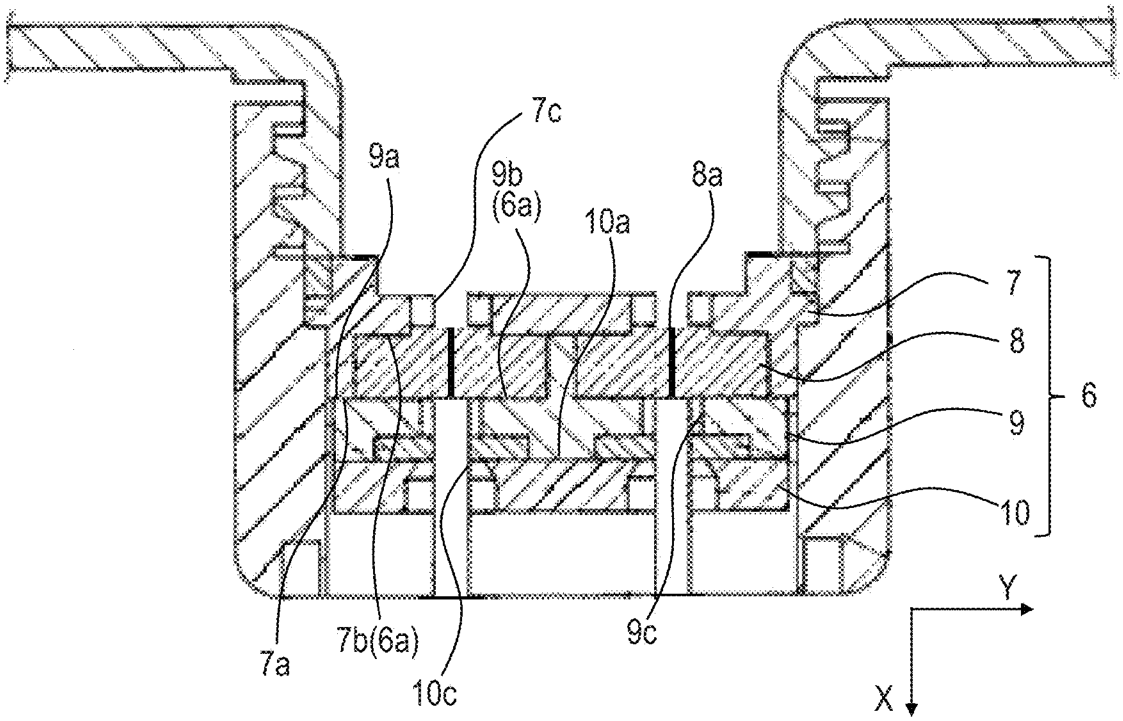
FIG. 3 is an enlarged view of the liquid supply component shown in FIG. 1.

FIG. 3 is an enlarged view of the liquid supply component 6 shown in FIG. 1. As shown in FIG. 3, the first component 7 has a first surface 7*a*, and a first depression 7*b* for accommodating the elastic component 8 is provided in the first surface 7*a*. Here, two first depressions 7*b* corresponding to the two hollow needles 5*a* and 5*b*, respectively, are provided adjacent to each other, and the elastic component 8 is accommodated in each of the first depressions 7*b*. A first through hole 7*c* penetrating the first component 7 in the thickness direction (X direction) is provided in a central section of each first depression 7*b*. A diameter of the first through hole 7*c* is a size that allows the hollow needle 5*a* (5*b*) to be inserted.

Since the section into which the hollow needle 5*a* is inserted and the section into which the hollow needle 5*b* is inserted have the same structure, only the structure of the section into which the hollow needle 5*a* is inserted will be described below to avoid redundant description.

The second component 9 has a second surface 9*a*, and a contact section 9*b* facing the first depression 7*b* and abutting on the elastic component 8 is provided in the second surface 9*a*. The second component 9 includes a second through hole 9*c* penetrating in the thickness direction (X direction). A diameter of the second through hole 9*c* is a size that allows the hollow needle 5*a* to be inserted. In a state where the second component 9 is assembled to the first component 7, the contact section 9*b* and the first depression 7*b* form a first space 6*a*.

The elastic component 8 has a slit 8*a* penetrating in the thickness direction (X direction). The elastic component 8 is accommodated in the first space 6*a* in a compressed state. The compressed elastic component 8 is deformed so as to close the slit 8*a*. In a state where the second component 9 is bonded to the first component 7, the first through hole 7c and the second through hole 9c are arranged so as to be linearly aligned via the slit 8a.

The third component 10 has a third surface 10a. The third component 10 includes a third through hole 10c penetrating in the thickness direction (X direction). The third component 10 is bonded to the second component 9 so that the third surface 10a abuts on a surface opposite to the second surface 9a of the second component 9. In a state where the first component 7, the second component 9, and the third component 10 are bonded to each other, the first through hole 7c, the slit 8a, the second through hole 9c, and the third through hole 10c are linearly arranged in the thickness direction (X direction). Thereby, it is possible to insert the hollow needle 5a (5b) into the slit 8a of the elastic component 8.

Figure 4:
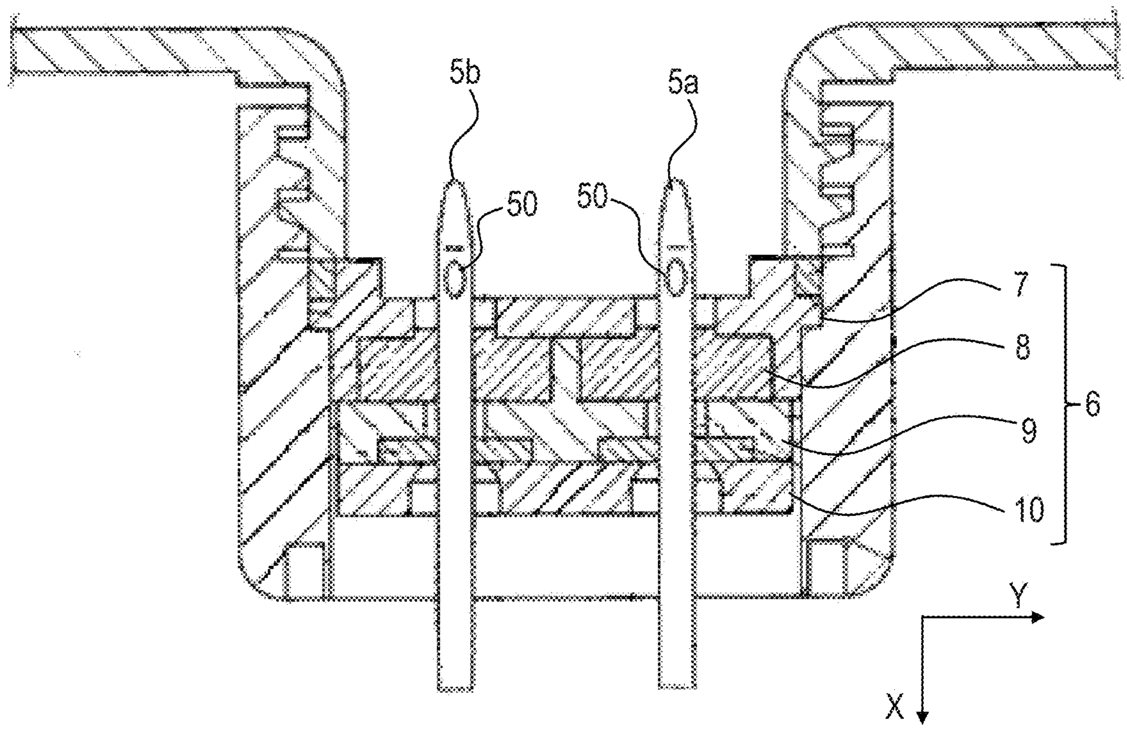
FIG. 4 is a schematic diagram showing a state in which hollow needles are inserted into the liquid supply component shown in FIG. 3.

FIG. 4 is a schematic diagram showing a state in which two hollow needles 5a and 5b are inserted into the liquid supply component 6 shown in FIG. 3. As shown in FIG. 4, the liquid storage container 3 is mounted on the container mounting section 30 so that the hollow needle 5a is inserted into the slit 8a of one elastic component 8 and the hollow needle 5b is inserted into the slit 8a of the other elastic component 8. Sufficient adhesion is ensured between the hollow needle 5a (5b) inserted into the slit 8a and the elastic component 8 so that liquid does not leak. Openings 50 are provided at respective tips of the hollow needles 5a and 5b. Liquid inside the liquid storage container 3 flows into the opening 50 of the hollow needle 5a, and air flows into the liquid storage container 3 from the opening 50 of the hollow needle 5b.

Instead of the hollow needle 5b, or separately from the hollow needle 5b, a connection section into which a hollow needle opened to the atmosphere is inserted may be provided in the liquid storage container 3. By using the hollow needle 5b and another hollow needle opened to the atmosphere in combination, liquid inside the liquid storage container 3 can be supplied more efficiently.

Next, a component bonding method constituting the liquid supply component 6 will be described.

Figures 5A, 5B, 5C:
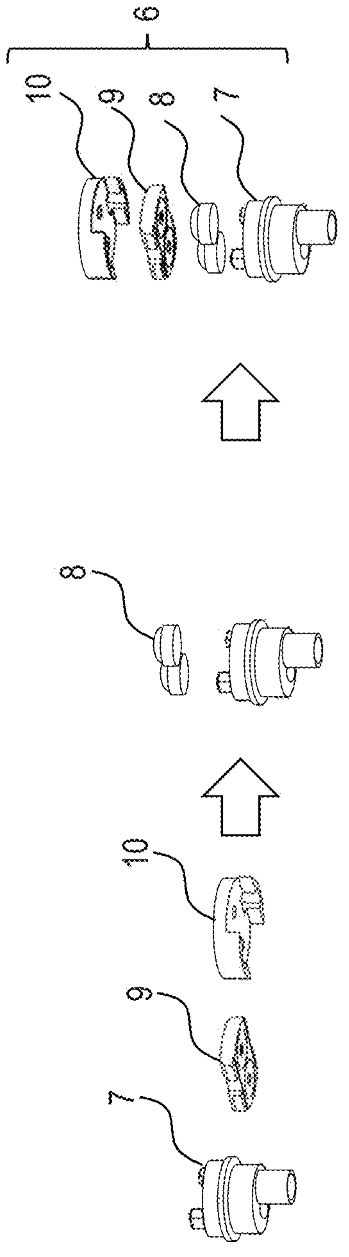
FIG. 5A is a schematic diagram of a first component, a second component, and a third component.
FIG. 5B is a schematic diagram showing a procedure for attaching an elastic component 8 to the first component.
FIG. 5C is a schematic diagram showing a procedure for sequentially assembling and bonding the first component, the elastic component, the second component, and the third component.

FIGS. 5A, 5B, and 5C are schematic diagrams showing a procedure for bonding each component of the liquid supply component 6. First, as shown in FIG. 5A, the first component 7, the second component 9, and the third component 10 are formed. Next, as shown in FIG. 5B, the elastic component 8 is attached to the first component 7. Finally, as shown in FIG. 5C, the first component 7, the elastic component 8, the second component 9, and the third component 10 are sequentially assembled and bonded.

The above is a description of the basic configuration of the liquid supply component 6 to which the component bonding method of the present disclosure is applied.

Next, an embodiment of the component bonding method of the present disclosure will be described by taking the components constituting the liquid supply component 6 described above as an example.

First Embodiment

Figure 6C:
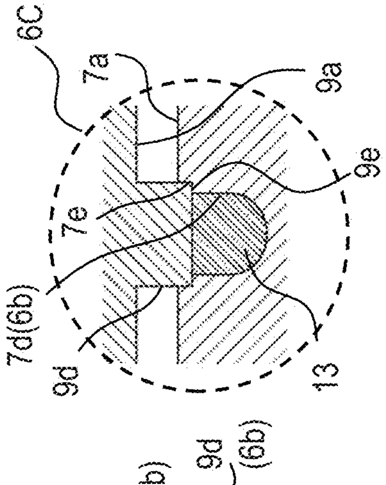
FIG. 6C is an enlarged view of a section 6C in FIG. 6B.
Figure 6B:
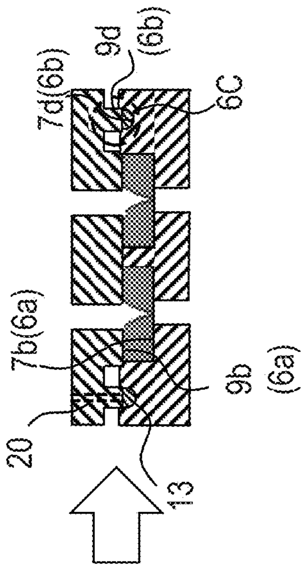
FIG. 6B is a schematic cross-sectional view showing the first component, the second component, and the elastic component assembled.
Figure 6A:
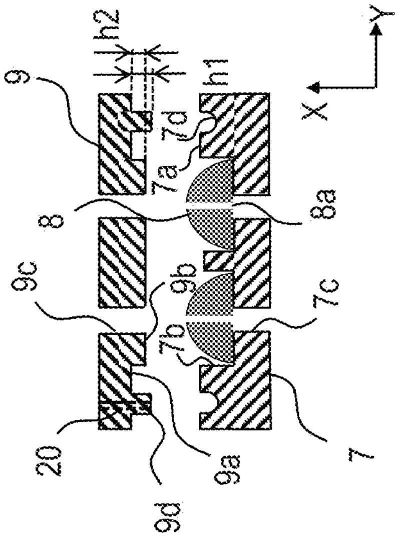
FIG. 6A is a schematic cross-sectional view showing a part of the first component, the second component, and the elastic component.
Figure 6D:
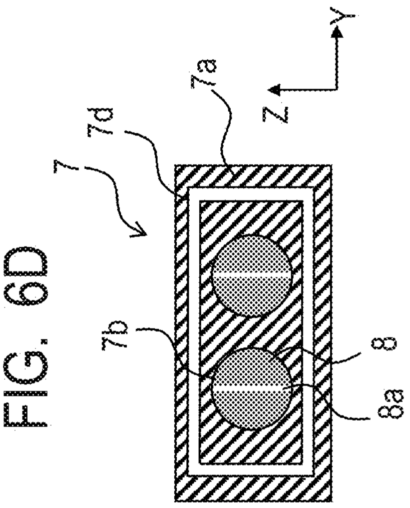
FIG. 6D is a plan view of the first component in a state where the elastic component is accommodated in the first depression.

FIGS. 6A to 6D are diagrams for explaining a component bonding method according to the first embodiment of the present disclosure. FIGS. 6A and 6B are cross-sectional views schematically showing states before and after bonding the first component 7 and the second component 9, respectively. FIG. 6C is an enlarged view of a section 6C in FIG. 6B. FIG. 6D is a plan view of the first component 7 in a state where the elastic component 8 is accommodated in the first depression 7b. In FIGS. 6A and 6B, the vertical relationship (orientation in the X direction) between the first component 7 and the second component 9 is opposite to that in FIG. 3.

In the component bonding method of the present embodiment, the elastic component 8 is held in a compressed state between the first component 7 and the second component 9, and a part of the first component 7 and a part of the second component 9 are bonded. Specifically, first, as shown in FIG. 6A, the first component 7, the second component 9, and the elastic component 8 are prepared, and the elastic component 8 is accommodated in the first depression 7b of the first component 7. Next, as shown in FIG. 6B, the first component 7, the second component 9, and the elastic component 8 are assembled so that the elastic component 8 is accommodated in the first space 6a in a compressed state.

In the present embodiment, as shown in FIGS. 6A and 6D, a second depression 7d surrounding the first depression 7b is provided in the first surface 7a. A protrusion 9d facing the second depression 7d and surrounding the convex contact section 9b is provided in the second surface 9a. As shown in FIG. 6C, an edge 7e of the second depression 7d includes a receiving section capable of fitting an edge 9e of a tip of the protrusion 9d. By mating the edge 7e of the second depression 7d and the edge 9e of the tip of the protrusion 9d, a second space 6b separate from the first space 6a is formed. Each of the first space 6a and the second space 6b is adjacent to the first component 7 and the second component 9. The second space 6b is filled with a molten resin 13, which is a first molten resin. The second component 9 includes a flow path 20 communicating with the second space 6b, and the second space 6b can be filled with the molten resin 13 using the flow path 20. As the molten resin 13, for example, a thermoplastic resin or a thermosetting resin typified by polypropylene can be used. Finally, by curing the filled molten resin 13, the second depression 7d, which is a part of the first component 7, and a tip section of the protrusion 9d, which is a part of the second component 9, are bonded.

According to the component bonding method of the present embodiment, since the second space 6b filled with the molten resin 13 is completely separate from the first space 6a accommodating the elastic component 8, the molten resin 13 can be prevented from contacting the elastic component 8. Therefore, for example, when injection molding is applied to form and bond the first component 7 and the second component 9, it is possible to suppress the restrictions on the material and molding conditions that occurs in the method described in Japanese Patent No. 6257995. Therefore, compared with the method described in Japanese Patent No. 6257995, it is possible to reduce costs and improve the reliability of bonding.

In addition, the sealability of the second space 6b is enhanced by mating the edge 7e of the second depression 7d and the edge 9e of the tip of the protrusion 9d. In other words, the second space 6b is a sealed space. Thereby, since it is possible to prevent the molten resin 13 filled in the second space 6b from leaking out, the reliability of bonding components can be further enhanced.

As shown in FIG. 6A, a height h1 of the protrusion 9d from the second surface 9a and a height h2 of the contact section 9b from the second surface 9a have a relationship of h1>h2. With this relationship, when the edge 9e of the tip of the protrusion 9d is mated with the edge 7e of the second depression 7d, it is possible to suppress unnecessary interference occurring between the contact section 9b of the second component 9 and the first surface 7a of the first component 7.

Further, the third component 10 may be disposed on the side opposite to the second surface 9a of the second component 9, and the third component 10 may be bonded to the second component 9. For example, a part of the third component 10 and a part of the second component 9 form a third space separate from the first space 6*a*. The third space is adjacent to the third component 10 and the second component 9. This third space is filled with a molten resin 13, which is a second molten resin, so that the third component 10 and the second component 9 are bonded.

Figure 7:
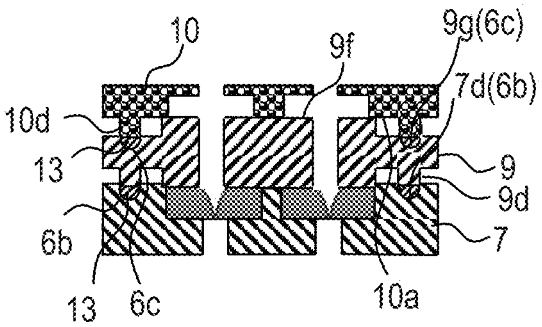
FIG. 7 is a schematic diagram showing an example of a bonding structure of the third component.

FIG. 7 is a schematic diagram showing an example of a structure in which the third component 10 is bonded to the second component 9. Referring to FIG. 7, the third component 10 has a third surface 10*a*, and a protrusion 10*d* is provided in the third surface 10*a*. A depression 9*g* is provided in a surface (back surface) 9*f* opposite to the second surface 9*a* of the second component 9. The protrusion 10*d* and the depression 9*g* correspond to the protrusion 9*d* of the second component 9 and the second depression 7*d* of the first component 7, respectively. As in the state shown in FIG. 6C, the third space 6*c* is formed by mating an edge of a tip of the protrusion 10*d* of the third component 10 and an edge of the depression 9*g* of the second component 9. The third component 10 includes a flow path (not shown) communicating with the third space 6*c*, and the third space 6*c* can be filled with the molten resin 13 using the flow path. The third space 6*c* is filled with the molten resin 13 so that the second component 9 and the third component 10 are bonded.

Further, the component bonding method of the present embodiment also has the following effects compared with a component bonding method using a welding machine.

Comparative Example

Figure 8A:
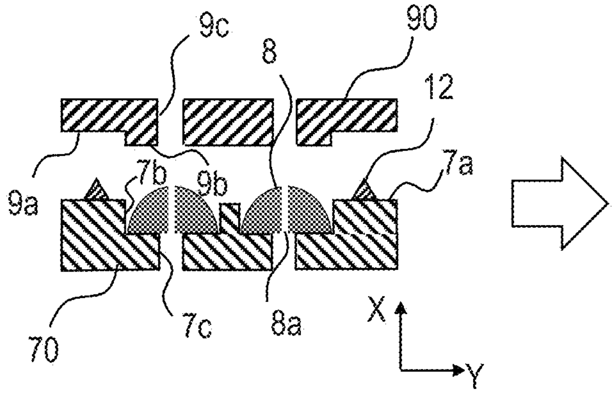
FIG. 8A is a cross-sectional view showing a step of preparing a first component, a second component, and an elastic component in a comparative example.
Figure 8B:
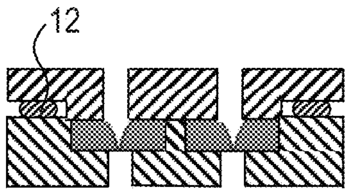
FIG. 8B is a cross-sectional view showing a state in which the first component and the second component are welded.

FIGS. 8A and 8B are diagrams for explaining a component bonding method shown as a comparative example of the present embodiment. In the component bonding method of this comparative example, the first component 70 and the second component 90 are bonded using a welding machine. The first component 70 of this comparative example is different from the first component 7 of the present embodiment in that it does not have the second depression 7*d*, and is the same as the first component 7 in other respects. The second component 90 of this comparative example is different from the second component 9 of the present embodiment in that it does not have the protrusion 9*d*, and is the same as the second component 9 in other respects.

In the component bonding method of this comparative example, as shown in FIG. 8A, the first component 70, the second component 90, and the elastic component 8 are prepared. The elastic component 8 is accommodated in the first depression 7*b* of the first component 70. A welding rib 12 is provided in a region adjacent to the first depression 7*b* in the first surface 7*a*.

Next, as shown in FIG. 8B, after aligning the positions of the bonding section between the first component 70 and the second component 90, ultrasonic welding is performed while pressing the welding rib 12 provided in the first surface 7*a* of the first component 70 against the second surface 9*a* of the second component 90. Energy due to ultrasonic waves is concentrated on the welding rib 12, and welding is performed using heat (frictional heat or the like) generated by expansion and contraction of the rib.

However, in ultrasonic welding in which ultrasonic waves are applied while pressing, deformation of the components, inclination and displacement of the components, and the like occur, and the pressure applied to the welding rib 12 during welding may decrease, and the welded section may not be appropriately bonded. In addition, if variations in the shape of the welding rib 12 (for example, the height of a triangular shape) or temperature variations during welding occur, a desired bonding force may not be obtained. In any case, a sufficient bonding force cannot be secured against the repulsive force of the elastic component 8 in the compressed state, and the bonding section is detached and the elastic component 8 is insufficiently compressed. As a result, the sealability of a contacting section (interface) between the elastic component 8 and the first depression 7*b* deteriorates, and liquid inside the liquid storage container 3 may leak.

Although it is possible to suppress a decrease in pressure on the rib during welding by increasing the rigidity of a section that supports the back surface of the welding rib 12, in this case, there is a restriction on the shape of increasing the rigidity of the supporting section.

Further, by enlarging the welding rib 12 or increasing the number thereof, it is possible to increase the bonding area and improve the reliability of bonding. However, if the welding rib 12 is enlarged, energy required to melt the rib increases. When the number of welding ribs 12 is increased, the problem of restriction on the shape of increasing the rigidity of the supporting section becomes even greater.

On the other hand, in the component bonding method of the present embodiment, as shown in FIG. 6C, the first component 7 and the second component 9 are bonded by filling the second space 6*b* with the molten resin 13. According to this bonding method, compared with the bonding method of the comparative example, it is possible to secure a sufficient bonding force against the repulsive force of the elastic component 8 in the compressed state. In particular, when injection molding is applied, the positions of the bonding section can be accurately aligned using a mold, and deformation of the components, inclination and displacement of the components, and the like are unlikely to occur. Therefore, it is possible to provide an assembly with high reliability of bonding components.

Further, in the elastic component 8 in the compressed state, since the pressure applied to the side surface of the hollow needle 5*a* (5*b*) inserted into the slit 8*a* is stabilized over the entire outer periphery, the adhesion between the side surface of the hollow needle 5*a* (5*b*) and the elastic component 8 is also stabilized. As a result, the user can easily insert and remove the hollow needle 5*a* (5*b*).

Furthermore, by widening the second space 6*b* or increasing the number thereof, it is possible to increase the bonding area and further increase the bonding force. Here, the bonding area is equal to the area of the inner wall of the second space 6*b*. When widening the second space 6*b*, for example, the width of each of the second depression 7*d* and the first protrusion 9*d* is increased. When increasing the number of the second spaces 6*b*, for example, two second depressions 7*d* are provided inside and outside in the first surface 7*a*, and two first protrusions 9*d* are provided inside and outside in the second surface 9*a*. The inner second depression 7*d* and the inner first protrusion 9*d* form the second space 6*b*, and the outer second depression 7*d* and the outer first protrusion 9*d* form another second space 6*b*. Thus, it is possible to easily increase the size and number of the second spaces 6*b*.

Further, by widening the second space 6*b*, resistance when the molten resin 13 flows in can be reduced, so that the molten resin 13 can be efficiently poured into the second space 6*b*. Note that when the second space 6*b* is narrow, for example, due to an increase in pressure loss when the second space 6*b* is filled with the molten resin 13, it may be difficult to pour the molten resin 13 into the entire second space 6*b*.

In addition, the second depression 7*d* is groove-shaped, and a cross-sectional shape of the bottom surface of the second depression 7*d* in the width direction thereof is curved. Therefore, when the second space 6*b* is filled with the molten resin 13, it is possible to easily pour the molten resin 13 in the longitudinal direction of the second depression 7*d*. Note that the cross-sectional shape of the bottom surface of the second depression 7*d* is not limited to be curved. As long as the molten resin 13 can flow, the cross-sectional shape of the bottom surface of the second depression 7*d* may be any shape.

Furthermore, the material of the molten resin 13 may be the same as or different from the material of the first component 7 and the second component 9. When the material of the molten resin 13 is different from the material of the first component 7 and the second component 9, the selection range of the material of the molten resin 13 is widened. In this case, for example, a material that can increase the bonding force can be used as the molten resin 13. Further, it is also possible to use a material that can be easily flowed into the first space 6*a* as the molten resin 13.

Furthermore, if the molten resin 13 touches the elastic component 8, the elastic component 8 may be altered and deformed by heat, and a function (repulsive force or the like) required for the elastic component 8 may deteriorate. In order to prevent the molten resin 13 from reaching the elastic component 8 when the molten resin 13 leaks from the second space 6*b*, means for preventing the molten resin 13 from flowing in may be provided in the first component 7 or the second component 9. For example, the mating structure between the edge 7*e* of the second depression 7*d* and the edge 9*e* of the tip of the protrusion 9*d* shown in FIG. 6C may be applied to the first depression 7*b* of the first component 7 and the contact section 9*b* of the second component 9. Further, a wall or a groove may be provided in the first surface 7*a* of the first component 7 so as to surround the first depression 7*b*. Further, a wall or a groove may be provided in the second surface 9*a* of the second component 9 so as to surround the contact section 9*b*. In any case, it is possible to prevent the molten resin 13 from flowing in by the wall or the groove.

In the present embodiment, as shown in FIG. 6C, the second depression 7*d* is provided in the first component 7 and the protrusion 9*d* is provided in the second component 9, but the present disclosure is not limited to this. The second depression 7*d* may be provided in the second surface 9*a* of the second component 9, and the protrusion 9*d* may be provided in the first surface 7*a* of the first component 7. Further, the shape of the mating section between the edge 7*e* of the second depression 7*d* and the edge 9*e* of the tip of the protrusion 9*d* is not limited to the shape shown in FIG. 6C. As long as leakage of the molten resin 13 can be suppressed, the mating section may be any shape.

Second Embodiment

Figure 9A:
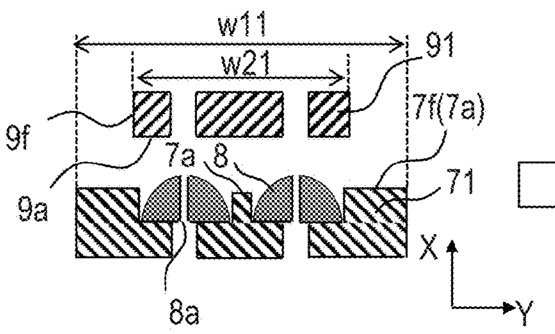
FIG. 9A is a cross-sectional view showing a step of preparing a first component 71, an elastic component 8, and a second component 91.
Figure 9B:
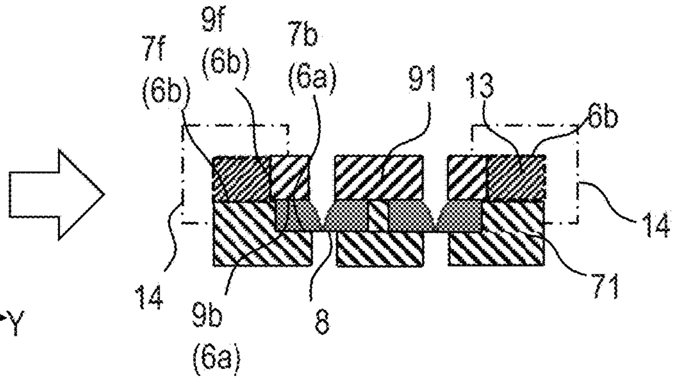
FIG. 9B is a process diagram showing a state in which the first component and the second component abut on each other.
Figure 9C:
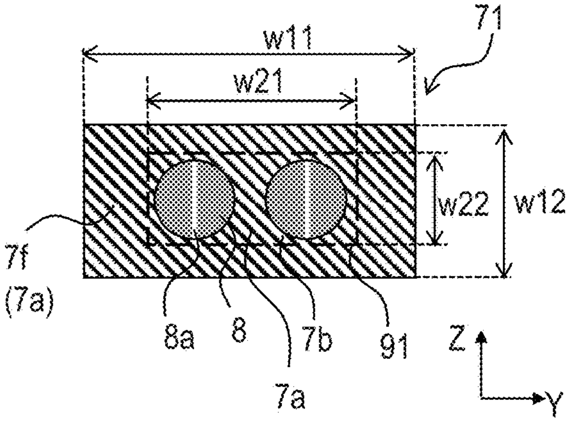
FIG. 9C is a plan view of the first component in a state where the elastic component is accommodated in the first depression.

FIGS. 9A to 9C are diagrams for explaining a component bonding method according to the second embodiment of the present disclosure. FIGS. 9A and 9B are cross-sectional views schematically showing states before and after bonding the first component 71 and the second component 91, respectively. FIG. 9C is a plan view of the first component 71 in a state where the elastic component 8 is accommodated in the first depression 7*b*. In FIG. 9C, a square frame indicated by a broken line indicates the size of the outer periphery of the side surface of the second component 91 shown in FIG. 9A.

In the component bonding method of the present embodiment, as shown in FIG. 9A, the first component 71, the elastic component 8, and the second component 91 are prepared. The first component 71 of the present embodiment is different from the first component 7 of the first embodiment in that it does not have the second depression 7*d*, and is the same as the first component 7 in other respects. The second component 91 of the present embodiment is different from the second component 9 of the first embodiment in that it does not have the protrusion 9*d*, and is basically the same as the second component 9 in other respects. However, the size of the outer periphery of the side surface of the second component 91 is smaller than the size of the outer periphery of the side surface of the first component 71. Specifically, as shown in FIG. 9C, a width w21 of the second component 91 in the longitudinal direction (Y direction) is smaller than a width w11 of the first component 71 in the longitudinal direction (Y direction). A width w22 of the second component 91 in the short direction (Z direction) is smaller than a width w12 of the first component 71 in the short direction (Z direction).

Further, as shown in FIGS. 9A and 9C, the first surface 7*a* of the first component 71 includes a first region 7*f* surrounding the first depression 7*b*. As shown in FIG. 9B, in a state where the second surface 9*a* of the second component 91 abuts on the first surface 7*a* of the first component 71, the first region 7*f* is adjacent to a side surface 9*f* of the second component 91. In the present embodiment, the second space 6*b* for filling the molten resin 13 is formed using the first region 7*f* of the first component 71, the side surface 9*f* of the second component 91, and an additional component 14. The additional component 14 is a component having resistance to the molten resin 13, and is, for example, a mold. For filling the second space 6*b* with the molten resin 13, for example, the second component 91 or the additional component 14 can be used. In this case, the second component 91 or the additional component 14 includes a flow path communicating with the second space 6*b*, and the second space 6*b* is filled with the molten resin 13 using the flow path.

In the component bonding method of the present embodiment, first, as shown in FIG. 9A, the elastic component 8 is accommodated in the first depression 7*b* of the first component 71. Next, as shown in FIG. 9B, the first component 71, the second component 91, and the additional component 14 are assembled so that the first space 6*a* and the second space 6*b* are formed and the elastic component 8 is accommodated in the first space 6*a* in a compressed state. The first region 7*f* and the side surface 9*f* form at least a part of the inner wall of the second space 6*b*. Finally, the molten resin 13 is filled into the second space 6*b*, and the molten resin 13 is cured to bond the first region 7*f*, which is a part of the first component 71, and the side surface 9*f*, which is a part of the second component 91.

After the molten resin 13 is cured, the additional component 14 is removed.

The component bonding method of the present embodiment also has the same operations and effects as the component bonding method of the first embodiment.

Further, according to the component bonding method of the present embodiment, compared with the first embodiment, the bonding area of the bonding section between the first component 71 and the second component 91 (the total of the area of the first region 7*f* and the area of the side surface 9*f*) can be increased, so that the bonding force can be further increased. Therefore, the reliability of bonding components is further improved.

Further, as shown in FIG. 9B, the size of the outer periphery of the side surface of the section including the molten resin 13 and the second component 91 matches the size of the outer periphery of the side surface of the first component 71. In other words, the second component 91 is bonded to the first component 71 in accordance with the size of the outer periphery of the side surface of the first component 71. Thereby, the size of the outer periphery of the side surface of the liquid supply component 6 can be made constant regardless of the bonding section. Therefore, for example, it is possible to suppress complication of an attachment structure to the connection section (opening) of the liquid storage container 3 shown in FIG. 1.

In the present embodiment, the relationship between the widths of the first component 71 and the second component 91 is w21<w11 and w22<w12, but the present disclosure is not limited to this. As long as the first component 71 and the second component 91 can be appropriately bonded, the relationship may be w21<w11 and w22=w12, or w21=w11 and w22<w12.

Third Embodiment

Figures 10A, 10B:
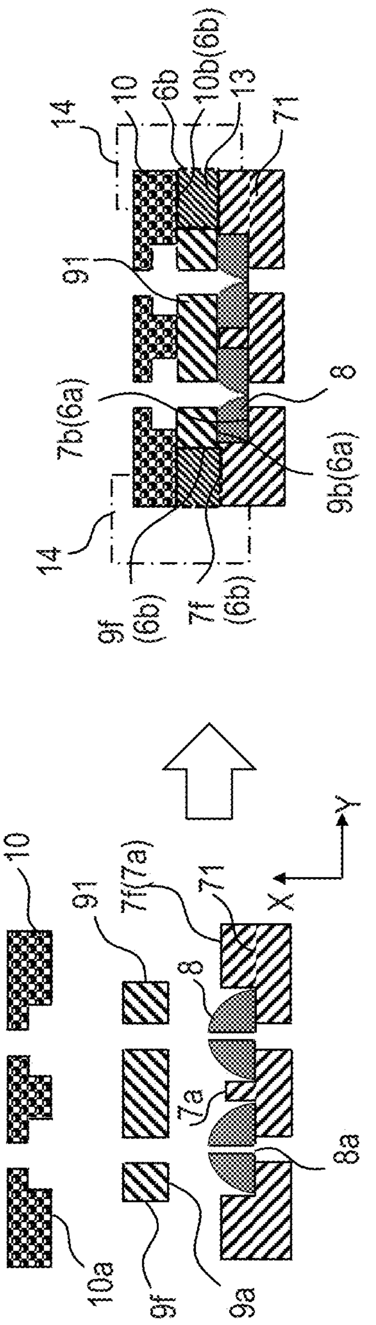
FIG. 10A is a cross-sectional view showing a step of preparing a first component 71, an elastic component 8, a second component, and a third component.
FIG. 10B is a cross-sectional view showing a state in which the first component 71, the elastic component 8, the second component, and the third component are assembled.

FIGS. 10A and 10B are diagrams for explaining a component bonding method according to the third embodiment of the present disclosure.

FIGS. 10A and 10B are cross-sectional views schematically showing states before and after bonding the first component 71 and the second component 91, respectively.

In the component bonding method of the present embodiment, as shown in FIG. 10A, the first component 71, the elastic component 8, the second component 91, and the third component 10 are prepared. Both the first component 71 and the second component 91 are the same as those used in the second embodiment. The size of the outer periphery of the side surface of the third component 10 is substantially the same as the size of the outer periphery of the side surface of the first component 71.

As shown in FIG. 10B, the third surface 10*a* of the third component 10 has a second region 10*b* facing the first region 7*f* of the first surface 7*a* of the first component 71. In a state where the second surface 9*a* of the second component 91 abuts on the first surface 7*a* of the first component 71, the first region 7*f* is adjacent to a side surface 9*f* of the second component 91. In a state where the third surface 10*a* of the third component 10 abuts on a surface opposite to the second surface 9*a* of the second component 9, the second region 10*b* is adjacent to the side surface 9*f* of the second component 91. In the present embodiment, the second space 6*b* for filling the molten resin 13 is formed using the first region 7*f* of the first component 71, the side surface 9*f* of the second component 91, the second region 10*b* of the third component 10, and an additional component 14 (for example, a mold). For filling the second space 6*b* with the molten resin 13, for example, the third component 10 or the additional component 14 can be used. In this case, the third component 10 or the additional component 14 includes a flow path communicating with the second space 6*b*, and the second space 6*b* is filled with the molten resin 13 using the flow path.

In the component bonding method of the present embodiment, first, as shown in FIG. 10A, the elastic component 8 is accommodated in the first depression 7*b* of the first component 71. Next, as shown in FIG. 10B, the first component 71, the second component 91, the third component 10, and the additional component 14 are assembled so that the first space 6*a* and the second space 6*b* are formed and the elastic component 8 is accommodated in the first space 6*a* in a compressed state. The first region 7*f*, the side surface 9*f*, and the second region 10*b* form at least a part of the inner wall of the second space 6*b*. Finally, the molten resin 13 is filled into the second space 6*b*, and the molten resin 13 is cured to bond the first region 7*f*, which is a part of the first component 71, the side surface 9*f*, which is a part of the second component 91, and the second region 10*b*, which is a part of the third component 10. After the molten resin 13 is cured, the additional component 14 is removed.

The component bonding method of the present embodiment also has the same operations and effects as the methods for bonding components of the first and second embodiments.

Further, according to the component bonding method of the present embodiment, the following effects can also be obtained compared with a bonding method using ultrasonic welding.

In the bonding method using ultrasonic welding, the first component and the second component are bonded by ultrasonic welding, and then the second component and the third component are bonded by ultrasonic welding. Thus, it is necessary to perform the ultrasonic welding process twice.

On the other hand, according to the component bonding method of the present embodiment, the first component 71, the second component 91, and the third component 10 can be bonded at once by filling the second space 6*b* with the molten resin 13. Therefore, compared with the bonding method using ultrasonic welding, the number of bonding steps can be reduced.

Injection molding can be applied to any of the methods for bonding components of the first to third embodiments described above.

Figure 11:
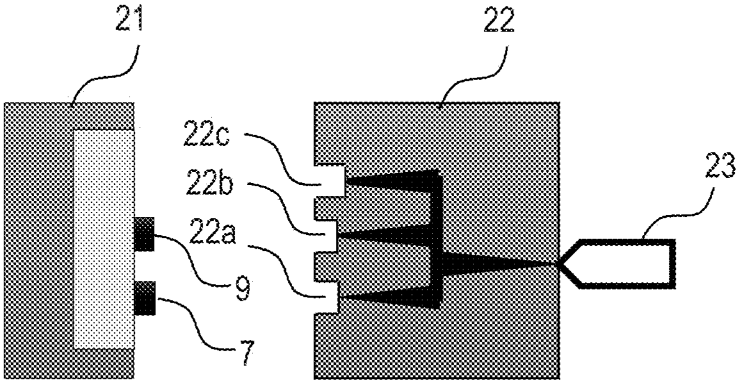
FIG. 11 is a schematic diagram showing an example of an injection molding machine.

FIG. 11 is a schematic diagram showing an example of an injection molding machine. As shown in FIG. 11, the injection molding machine includes a fixed-side first mold 21 and a movable-side second mold 22. The first mold 21 and the second mold 22 are disposed so as to face each other. An injection nozzle 23 for injecting molten resin is attached to the second mold 22. Molten resin injected from the injection nozzle 23 is supplied to three cavities 22*a* to 22*c* through a flow path inside the second mold 22.

A valve for controlling inflow of molten resin is provided in each of the cavities 22*a* to 22*c*. For example, by adopting a hot runner system, it is possible to easily switch the supply of molten resin to the cavities 22*a* to 22*c* only by switching the valve.

The cavity 22*a* is used to form the first component 7 (71). The cavity 22*b* is used to form the second component 9 (91). The cavity 22*c* is used to assemble the second component 9 (91) to the first component 7 (71) and bond them to each other. Although not shown in FIG. 11, a mechanism for moving the second mold 22, a mechanism for moving a molded product in the mold, and the like are also provided. Using these mechanisms, the first component 7 (71) and the second component 9 (91) can be formed in the mold, and the second component 9 (91) can be assembled to the first component 7 (71) and bonded.

As the moving mechanism, in addition to a slide mechanism that slides a component, a robot that moves a molded product or the like may be used. Further, multiple molds may be moved using a rotary table. Further, an intermediate mold may be provided, and the intermediate mold may be rotated to move the molded product to a position where the molten resin is poured.

Figure 12:
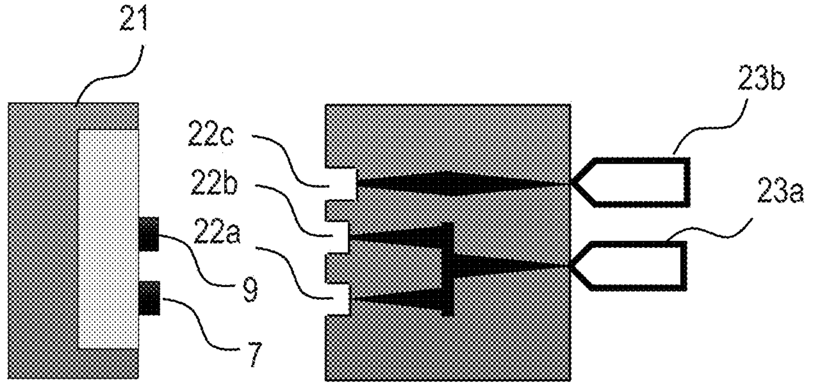
FIG. 12 is a schematic diagram showing another example of an injection molding machine.

FIG. 12 is a schematic diagram showing another example of an injection molding machine. The injection molding machine shown in FIG. 12 has the same configuration as the injection molding machine shown in FIG. 11 except that it has two injection nozzles 23*a* and 23*b*. The injection nozzle 23*a* communicates with each of the cavities 22*a* and 22*b* via a flow path. The injection nozzle 23*b* communicates with the cavity 22*c* via a flow path. The material of the molten resin used to bond the first component 7 (71) and the second component 9 (91) is different from the material of the molten resin used to form the first component 7 (71) and the second component 9 (91).

The component bonding method of the first or second embodiment can be carried out using the injection molding machine shown in FIG. 11 or FIG. 12. Further, the component bonding method of the third embodiment can be carried out by providing a cavity for forming the third component 10 in the second mold 22. When the number of components to be formed by injection molding is further increased, it is possible to cope with this by adding a cavity for each component.

FIGS. 13A to 13F are diagrams for explaining a procedure when the component bonding method of the first embodiment is carried out using the injection molding machine.

Figure 13A:
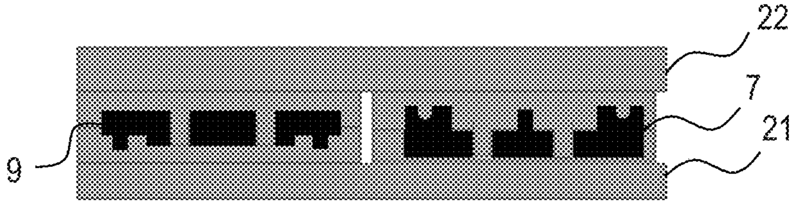
FIG. 13A is a cross-sectional view showing a step of forming a first component in a first mold and forming a second component in a second mold.
Figure 13B:
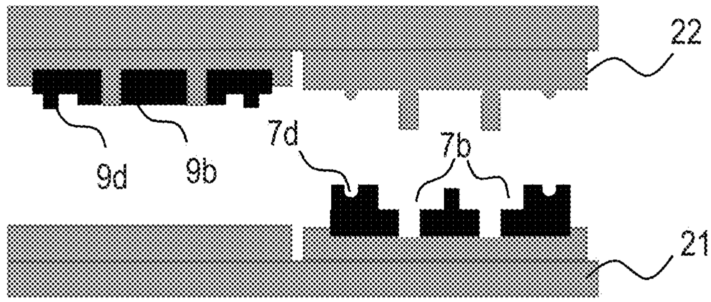
FIG. 13B is a cross-sectional view showing a step of providing a first depression in a first surface and providing a contact section in a second surface.

First, as shown in FIGS. 13A and 13B, the first component 7 is formed in the first mold 21 and the second component 9 is formed in the second mold 22. This step includes providing the first depression 7*b* and the second depression 7*d* in the first surface 7*a*, and providing the contact section (first protrusion) 9*b* and the second protrusion 9*d* in the second surface 9*a*.

Figure 13C:
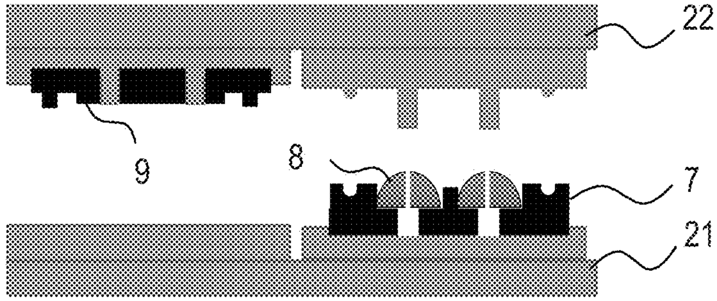
FIG. 13C is a cross-sectional view showing a step of accommodating an elastic component in the first depression.

Next, as shown in FIG. 13C, the elastic component 8 is accommodated in the first depression 7*b* of the first component 7.

Figure 13D:
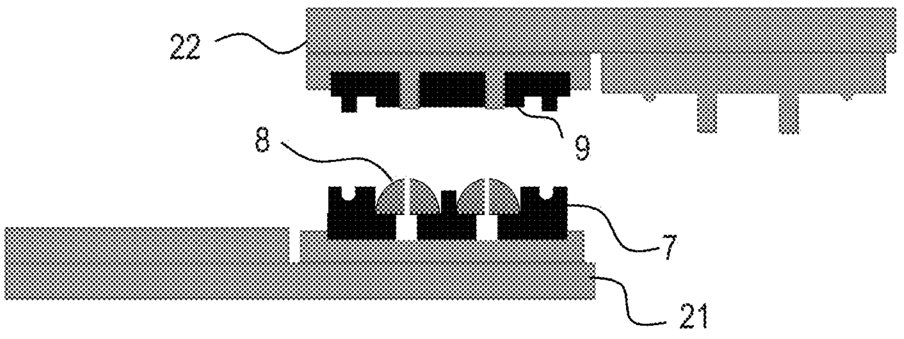
FIG. 13D is a cross-sectional view showing a step of moving the second mold relative to the first mold.
Figure 13E:
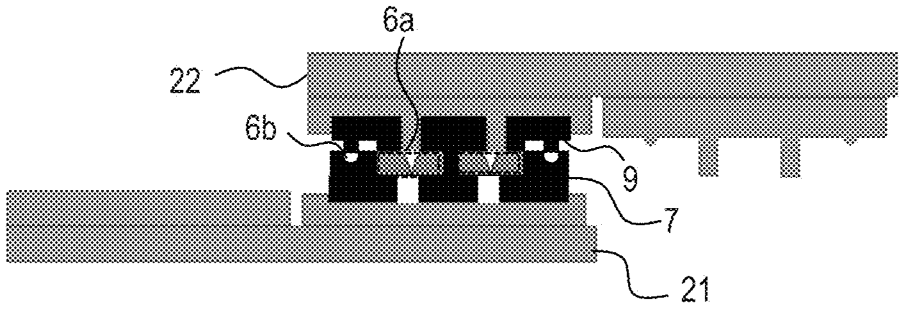
FIG. 13E is a cross-sectional view showing a step of assembling the first component and the second component.

Next, as shown in FIGS. 13D and 13E, the second mold 22 is relatively moved with respect to the first mold 21 to assemble the second component 9 to the first component 7. This step includes forming the first space 6*a* by the contact section (first protrusion) 9*b* and the first depression 7*b*, accommodating the elastic component 8 in the first space 6*a* in a compressed state, and mating the edge of the second depression 7*d* and the edge of the tip of the second protrusion 9*d* to form the second space 6*b*.

Figure 13F:
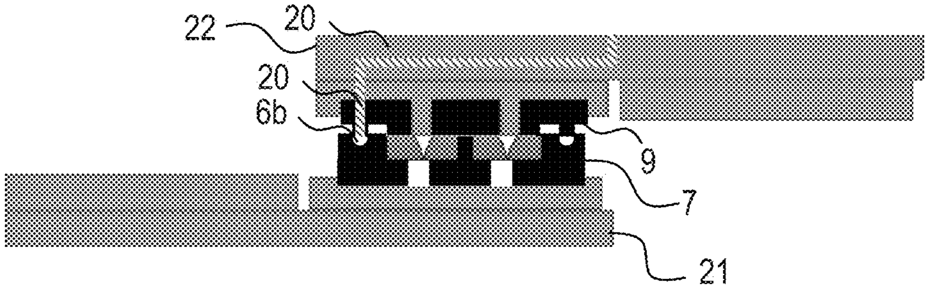
FIG. 13F is a cross-sectional view showing a step of bonding the first component and the second component by molten resin.

Finally, as shown in FIG. 13F, the second space 6*b* is filled with molten resin to bond the first component 7 and the second component 9. This bonding step is performed in the cavity 22*c* shown in FIG. 11 or FIG. 12. The second component 9 is provided with the flow path 20 communicating with the second space 6*b*, and the molten resin can be poured into the second space 6*b* from an opening end (opening of the second space 6*b*) of the flow path 20. In the cavity 22*c*, the opening end of the flow path 20 communicates with a supply port of molten resin of the second mold. Thereby, the molten resin injected from the injection nozzle 23 (23*b*) can be poured into the second space 6*b*. After bonding, the mold is opened and the molded product is taken out.

The component bonding method of the second embodiment can also be basically carried out according to the steps shown in FIGS. 13A to 13F.

In the steps of FIGS. 13A and 13B, the first component 7 is formed in the first mold 21 and the second component 9 is formed in the second mold 22. A depression (first depression) 7*b* is provided in the first surface 7*a*, and a contact section 9*b* that abuts on the elastic component 8 is provided in the second surface 9*a*.

In the step of FIG. 13C, the elastic component 8 is accommodated in the depression (first depression) 7*b* of the first component 7.

In the steps of FIGS. 13D and 13E, the second mold 22 is moved with respect to the first mold 21 to assemble the second component 9 to the first component 7. The first space 6*a* is formed by the depression (first depression) 7*b* and the contact section 9*b*, and the elastic component 8 is accommodated in the first space 6*a* in a compressed state.

In the step of FIG. 13F, the second space 6*b* is formed by the first region 7*f* surrounding the depression (first depression) 7*b* in the first surface 7*a*, the side surface 9*f* of the second component 9, and a part of the second mold 22. The second space 6*b* is filled with molten resin to bond the first component 7 and the second component 9.

The component bonding method of the third embodiment can also be basically carried out according to the steps shown in FIGS. 13A to 13F.

In the steps of FIGS. 13A and 13B, the first component 7 is formed in the first mold 21, and the second component 9 and the third component 10 are formed in the second mold 22. A depression (first depression) 7*b* is provided in the first surface 7*a*, and a contact section 9*b* that abuts on the elastic component 8 is provided in the second surface 9*a*.

In the step of FIG. 13C, the elastic component 8 is accommodated in the depression (first depression) 7*b* of the first component 7.

In the steps of FIGS. 13D and 13E, the second mold 22 is moved to assemble the second component 9 and the third component 10 to the first component 7. The first space 6*a* is formed by the depression (first depression) 7*b* and the contact section 9*b*, and the elastic component 8 is accommodated in the first space 6*a* in a compressed state.

In the step of FIG. 13F, the second space 6*b* is formed by the first region 7*f* surrounding the depression (first depression) 7*b* in the first surface 7*a*, the side surface 9*f* of the second component 9, the second region 10*b* of the third component 10 (see FIG. 10B), and a part of the second mold 22. The second space 6*b* is filled with molten resin to bond the first component 7, the second component 9, and the third component 10.

According to the component bonding method using injection molding described above, the steps from forming the components to bonding them can be performed in the injection molding machine. Therefore, compared with the existing method in which the injection-molded components are positioned and welded by a welding machine, the apparatus cost can be significantly reduced.

Further, when the elastic component 8 is compressed, the clamping force of the injection molding machine can be used.

Since the clamping force is much stronger than the pressure of the welding machine, more stable compression of the elastic component 8 is possible.

In the component bonding method using injection molding described above, the elastic component 8 is not molded by the injection molding machine. If the slit 8*a* is opened in the elastic component 8 later, the molded product may be damaged. Therefore, when the elastic component 8 having the slit 8*a* can be injection-molded, it is preferable to mold the elastic component 8 by the injection molding machine as well.

According to the present disclosure, it is possible to provide a component bonding method that can reduce costs and improve the reliability of bonding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-190087, filed Nov. 7, 2023, which is hereby incorporated by reference herein in its entirety.

What is claimed is:

1. A liquid supply component to be attached to a liquid storage container, liquid supply component comprising:

a first component, a second component, an elastic component disposed between the first component and the second component, and a resin bonding the first component and the second component, wherein a first space accommodating the elastic component is formed by the first component and the second component, wherein the elastic component is accommodated in the first space in a compressed state, wherein the resin is located away from the first space and adjacent to the first component and the second component, and wherein the second component includes a flow path having a first end contacting the resin and a second end open to an outer surface of the second component.

2. The liquid supply component according to claim 1, wherein the first component has a first surface and a first depression provided in the first surface, the second component has a second surface and a contact section facing the first depression, and the elastic component is held between the first depression and the contact section.

3. The liquid supply component according to claim 1, wherein the elastic component has a slit penetrating in a thickness direction and the slit is closed in a state where the elastic component is compressed.

4. The liquid supply component according to claim 3, wherein the first component has a first through hole penetrating in the thickness direction, the second component has a second through hole penetrating in the thickness direction, and the first through hole, the slit, and the second through hole are aligned in the thickness direction.

5. The liquid supply component according to claim 2, wherein the first component has a second depression provided in the first surface and surrounding the first depression, the second component has a protrusion provided in the second surface and surrounding the contact section, and at least a part of the resin is located in the second depression and contacts an inner surface of the second depression and the protrusion.

6. The liquid supply component according to claim 5, wherein the second depression has a curved bottom surface.

7. The liquid supply component according to claim 5, wherein a height of the protrusion of the second surface is higher than a height of the contact section of the second surface.

8. The liquid supply component according to claim 2, wherein the liquid supply component further comprises a third component, and the third component is disposed as facing a surface on an opposite side to the second surface of the second component.

9. The liquid supply component according to claim 4, wherein the liquid supply component further comprises a third component, the third component is disposed as facing a surface on an opposite side to the second surface of the second component, the third component has a third through hole penetrating in the thickness direction, and the first through hole, the slit, the second through hole, and the third through hole are aligned in the thickness direction.

10. The liquid supply component according to claim 8, wherein the liquid supply component further comprises a second resin bonding the second component and the third component, the third component has a third surface facing the second component and a protrusion provided in the third surface, the second component has a depression provided in a surface facing the third surface, and at least a part of the second resin is located in the depression and contacts an inner surface of the depression and the protrusion.

* * * * *